United States Patent [19]

Matsuura

[11] Patent Number: 5,522,643
[45] Date of Patent: Jun. 4, 1996

[54] RECLINING DEVICE WITH ANGULAR POSITION MEMORY MECHANISM FOR SEAT BACK

[75] Inventor: Hiroshi Matsuura, Kosai, Japan

[73] Assignee: Fuji Kiko Co., Ltd., Tokyo, Japan

[21] Appl. No.: 233,681

[22] Filed: Apr. 26, 1994

[30] Foreign Application Priority Data

Apr. 28, 1993 [JP] Japan .................. 5-022534 U

[51] Int. Cl.$^6$ ...................................... B60N 2/20
[52] U.S. Cl. ......................... 297/367; 297/378.12
[58] Field of Search ........................ 297/367, 368, 297/369, 366, 378.12

[56] References Cited

U.S. PATENT DOCUMENTS

| | | | |
|---|---|---|---|
| 3,953,069 | 4/1976 | Tamura et al. | 297/367 |
| 3,958,828 | 5/1976 | Ishida et al. | 297/367 X |
| 4,502,730 | 3/1985 | Kazaoka et al, | 297/367 X |
| 4,660,886 | 4/1987 | Terada et al. | 297/367 |
| 4,930,841 | 6/1990 | Wittig | 297/378.12 |
| 4,995,669 | 2/1991 | Croft | 297/379 |

FOREIGN PATENT DOCUMENTS

| | | | |
|---|---|---|---|
| 0509865 | 10/1992 | European Pat. Off. | |
| 33 19 593 | 12/1983 | Germany . | |
| 35 21 730 | 12/1985 | Germany . | |
| 53-23426 | 3/1978 | Japan | 297/367 |
| 59-220427 | 12/1984 | Japan . | |
| 4-25804 | 5/1992 | Japan . | |
| 4-25803 | 5/1992 | Japan . | |

*Primary Examiner*—Peter M. Coomo
*Assistant Examiner*—David E. Allred
*Attorney, Agent, or Firm*—Foley & Lardner

[57] ABSTRACT

A reclining device with an angular inclination position memory mechanism comprises a pair of memory plates pivotally mounted on a seat-back side arm and cooperative to each other for mechanically memorizing an angular inclination position of the arm by engaging one of the memory plates with the arm and by engaging the other memory plate with the base plate, a spring-loaded sliding-contact member pivotally supported on the arm and engageable with the one memory plate, a sector gear fixed to the arm, a lock plate meshable with the sector gear for preventing rotation of the seat back, and a cam lever mechanically linked to the lock plate through a cam contact and to a reclining lever. A pivotal member is linked to the cam lever so that the lock plate disengages from the sector gear when the pivotal member is brought into sliding-contact with the sliding-contact member, based on forward inclining motion of the arm.

3 Claims, 8 Drawing Sheets

RECLINING DEVICE WITH ANGULAR POSITION MEMORY MECHANISM FOR SEAT BACK

BACKGROUND OF THE INVENTION

1. Field of the Invention

The present invention relates to a reclining device, and specifically to a reclining device with an angular position memory mechanism which is optimally applied for a reclining seat back of a two-door type vehicle.

2. Description of the Prior Art

As is generally known, in two-door type vehicles with a front reclining seat, it is advantageous that an angular position memory for a reclining seat back is incorporated in the reclining device in consideration with easy getting in and out of a car. For instance, when the seated passenger on the rear seat gets out the car, the seat back of the front seat is inclined forwards by pulling the reclining seat lever. Thereafter, in the case the vehicle passenger sits on the front seat, the seat back of the front seat is backwardly inclined again. In this case, the angular position memory acts to retain the seat back at the preset angular position. Thus, the reclining seat with the angular position memory is free from troublesome setting of the seat back to the desired angular inclination. On earlier-model vehicles, a reclining device with an angular position memory mechanism for a seat back and a seat slide are both employed to ensure fore-aft angular inclination adjustment of the seat back and fore-aft position adjustment of the seat cushion. A reclining device with a reclining angular position memory mechanism has been disclosed in Japanese Patent Second Publication (Tokko Heisei) No. 4-25803.

The previously-noted conventional reclining device with an angular position memory is attached onto a base plate on which a seat cushion is mounted. The reclining device includes a sector gear (upper toothed plate) rotatably received on a main pivot shaft rotatably attached onto the base plate. The sector gear is firmly fixed to a seatback-side arm. The arm is firmly secured to the seat back by means of bolts and rotatably received by the main pivot shaft of the base plate. The reclining device also includes a pivotable lock plate (lower toothed plate) having a toothed portion which is brought into meshed contact with the sector gear to prevent rotational movement of the sector gear to the base plate of the seat cushion so that the seat back is held at a desired angular position. A reclining-seat operating lever is provided to cause pivotal movement of the lock plate. Additionally, the reclining device includes an angular position memory mechanism which will be hereinafter abbreviated as only a memory. The memory comprises a spring-loaded memory lever which has a toothed portion and is pivotally supported by way of a pin mounted on the sector gear or the arm, and a main memory plate having a sectoral toothed portion which is meshed with the toothed portion of the memory lever through pivotal movement of the memory plate when the memory lever is held unloaded. The main memory plate is rotatably supported by the main pivot shaft. The memory includes a pair of auxiliary memory plates both associated with the main memory plate in such a manner as to sandwich the main memory plate. These auxiliary memory plates cooperatively function to hold the main memory plate in the preset angular position, when reaching the preset angular position. The memory also includes a sector-gear side sliding-contact member which is responsive to a forward inclining movement of the seatback arm to cause a smooth sliding-contact surface formed on the outer periphery of the contact member to be put into contact with the toothed portion of the lock plate in the event of the forward angular inclination of the seat back.

During angular inclination adjustment, the seated passenger on the front seat displaces an angular position of the seat back to a desired position and then the memory lever is engaged with the main memory plate to mechanically memorize the desired angular inclination. In the prior-art reclining device disclosed in the Japanese Patent Second Publication No. 4-25803, if the seat back is inclined forwards by the operating lever in order that the seated passenger on the rear seat gets out of the car, the outer peripheral toothed portion of the lock plate does not mesh with the sector gear but with the sector-gear side sliding contact member. Under this condition, in the event that the seat back is rotated in the backward angular inclination direction, the sliding contact member is disengaged from the outer peripheral toothed portion of the lock plate since the sector-gear side sliding-contact member is pushed and rotated by the main memory plate when the seat back or the main memory plate reaches the preset angular inclination. As a result, the lock plate meshes with the sector gear, thereby ensuring the recovery of the seat back to the memorized reclining angular position. The previously-noted conventional reclining device with an angular position memory includes a sliding-contact member engageable with a lower toothed lock plate to prevent direct contact between toothed portions of an upper sector gear and a lower lock plate during forward inclining motion of the seat back, particularly at most forward inclination position of the seat back and consequently to avoid tooth wear. However, there is a possibility that undesirable tooth wear still occurs owing to sliding contact between the sliding-contact member and the toothed portion of the lock plate. To avoid sliding contact between the toothed lock plate and the sector-gear side sliding-contact member, Japanese Patent Second Publication (Tokko Heisei) No. 4-25804 teaches the provision of an additional sliding-contact member attached onto the lock plate. At a forward angular inclination position of the seat back, the two sliding-contact members cooperate in sliding contact relation with one another, thereby preventing tooth wear of the toothed portion of the lock plate owing to forward inclination movement of the seat back. With the above-noted arrangement of the reclining device disclosed in the Japanese Patent Second Publication No. 4-25804, there is a great frictional force between the two sliding-contact members at the forward inclination position. Traditionally, the seat back is biased forwards by virtue of a spiral spring or a power spring. In the event that the vehicle passenger shifts the seat back from the forward inclination position to the backward inclination position, the backward inclining effort of the passenger becomes thus increased owing to the sum of pre-load applied to the spring-loaded seat back and the frictional force between the two sliding-contact members.

SUMMARY OF THE INVENTION

Accordingly, it is an object of the invention to provide an improved reclining device with an angular position memory of a seat back which avoids the foregoing disadvantages of the prior art.

It is another object of the invention to provide a reclining device with an angular position memory of a seat back, which minimizes a backward inclining effort of a seated passenger when backwardly shifting the seat-back from a forward inclination position to a preset angular position.

It is a further object of the invention to provide a reclining device with an angular position memory for a seat back, which prevents tooth wear of both toothed portions of an upper sector gear attached to a seat-back arm and a lower lock plate pivotally linked to a seat cushion.

In order to accomplish the aforementioned and other objects of the invention, a reclining device with an angular inclination position memory mechanism comprises an arm fixed to a seat back for co-rotation therewith, a base plate fixed to a seat cushion, a pair of memory plates pivotally mounted on the arm and cooperative to each other for mechanically memorizing an angular inclination position of the arm by engaging one of the memory plates with the arm and by engaging the other memory plate with the base plate, a spring-loaded sliding-contact member pivotally supported on the arm and being engageable with the one memory plate, a sector gear fixed to the arm, a lock plate meshable with the sector gear, for preventing rotation of the arm, and a cam lever pivotally supported on the base plate and mechanically linked to the lock plate through a cam contact and to a reclining lever. The reclining device is characterized by a pivotal member pivotally supported on the base plate and brought into sliding-contact with the sliding-contact member, based on forward inclining motion of the arm. The pivotal member is mechanically linked to the cam lever, so that the lock plate disengages from the sector gear by a pivotal movement of the pivotal member caused by sliding-contact between the pivotal member and the sliding-contact member. The pivotal member is mechanically linked to the cam lever through a sole pin connection.

According to another aspect of the invention, a reclining device with an angular inclination position memory mechanism comprises a first pivot shaft rotatably attached onto a base plate fixed to a seat cushion, an arm rotatably received by the first pivot shaft and fixed to a seat back of a reclining seat, a main memory plate pivotally supported on the first pivot shaft, a memory lever pivotally supported on a second pivot shaft attached onto the arm, the memory lever being engageable with the main memory plate, an auxiliary memory plate pivotally supported on the first pivot shaft and engageable with a stationary stopper of the base plate, the auxiliary memory plate, the main memory plate, and the memory lever mechanically linked to each other, for mechanically memorizing an angular inclination position of the arm by locking the main memory plate at a preset angular position with respect to the arm, a sliding-contact member pivotally supported on the first pivot shaft and pre-loaded towards a spring-set angular position with respect to the arm, the sliding-contact member being engageable with the main memory plate, a reclining lever, a sector gear fixed to the arm, and a lock plate meshable with the sector gear, for preventing rotation of the arm. The reclining device is characterized by a pivotal member pivotally supported on a third pivot shaft attached onto the base plate and brought into sliding-contact contact with the sliding-contact member, based on forward inclining motion of the arm, a cam lever through which the pivotal member is mechanically linked to the reclining lever, the cam lever pivotally supported on a fourth pivot shaft attached to the base plate and having a cam connection with the lock plate, and the pivotal member cooperatively linked to the cam lever so that the lock plate disengages from the sector gear when the pivotal member is put into contact with the sliding-contact member. A sliding-contact surface of the sliding-contact member may be preferably dimensioned so that the sliding-contact member disengages from the pivotal member upon a backward angular displacement of the arm is reached to a preset angular displacement based on the angular inclination position of the arm. The pivotal member cooperates with the cam lever so that the lock plate engages with the sector gear when the pivotal member is put out of contact with the sliding-contact member. The pivotal member has an elliptic hole and the cam lever has a pin, and that the pivotal member is mechanically linked to the cam lever so that the pin is slidably fitted into the elliptic hole, and that the cam lever is mechanically linked to the operating lever through a connecting rod attached onto the cam lever. A lever ratio of a distance between the third pivot shaft and the pin to a distance between the fourth pivot shaft and the pin may be designed so that a frictional force created by the contact between the pivotal member and the sliding-contact member is set at a minimum possible value necessary to retain the sliding-contact member in engagement with the pivotal member against the pre-load acting on the sliding-contact member.

DESCRIPTION OF THE PREFERRED EMBODIMENTS

Figure 1:
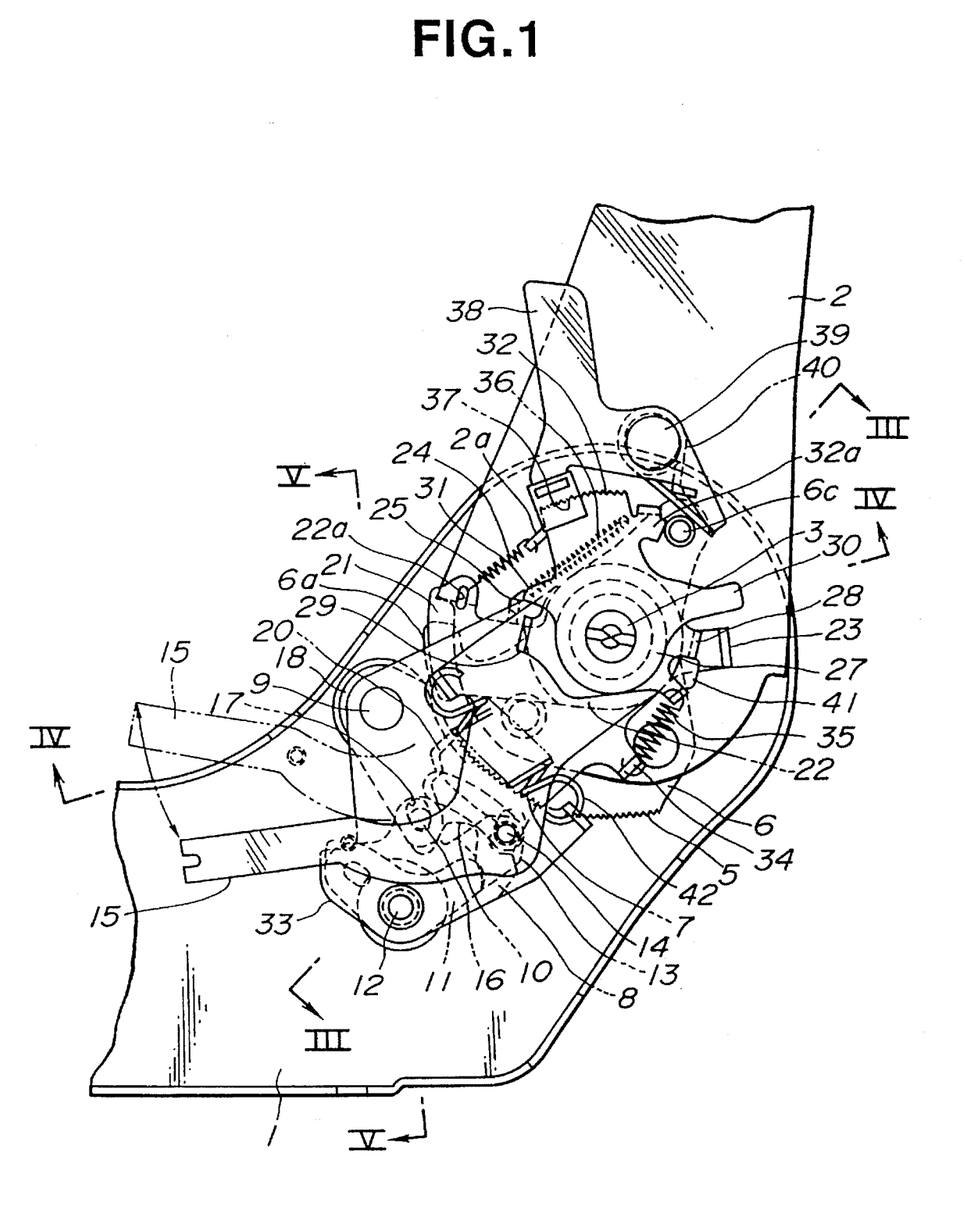
FIG. 1 is a side view illustrating one embodiment of a reclining device with an angular position memory according to the invention.
Figure 2:
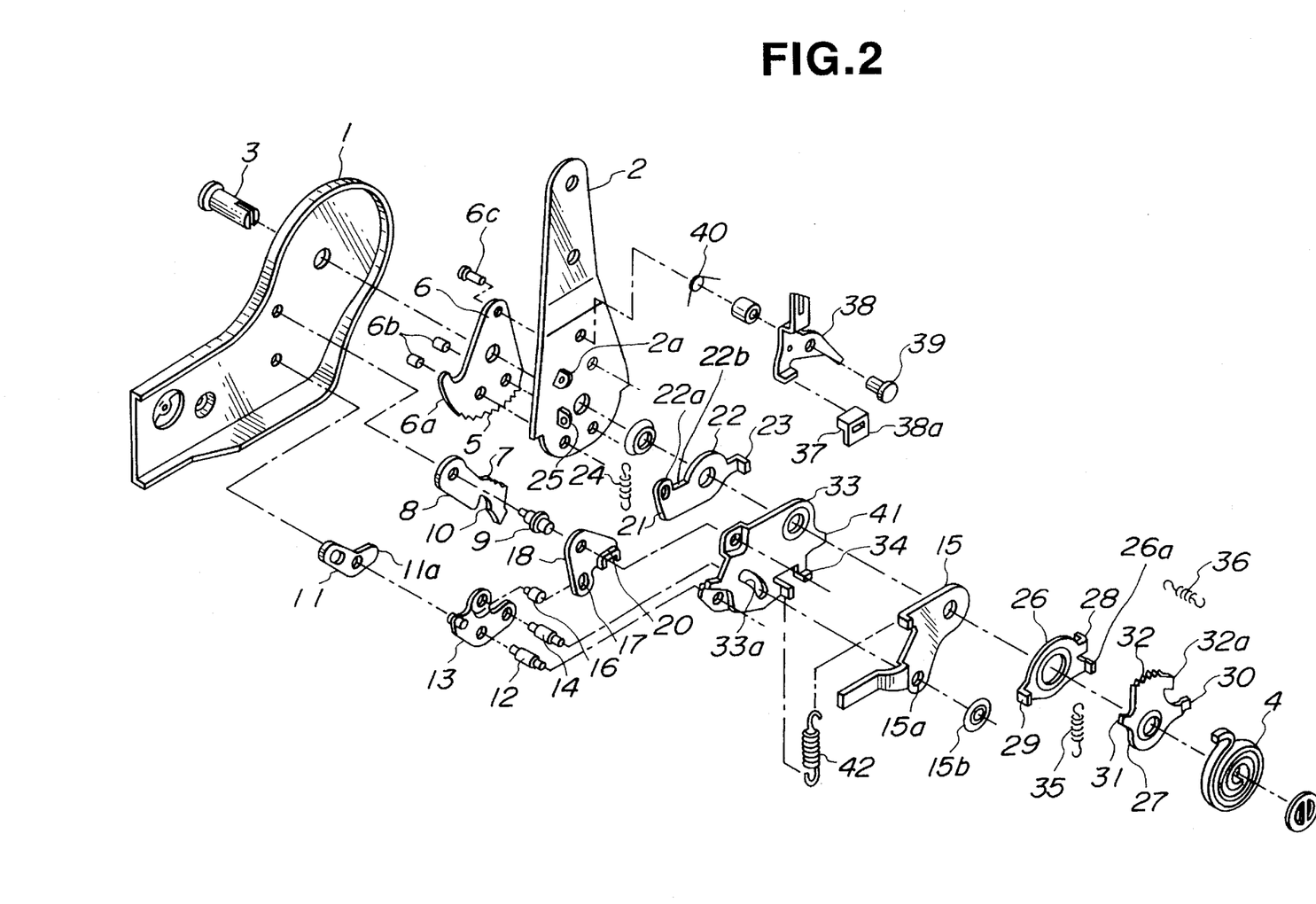
FIG. 2 is an exploded perspective view illustrating the reclining device of FIG. 1.
Figure 3:
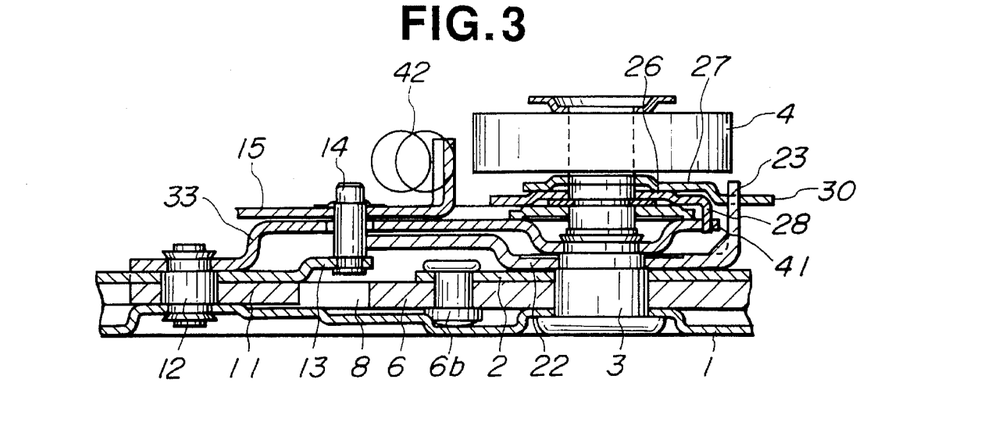
FIG. 3 is a cross-section taken along line A—A of FIG. 1.
Figure 4:
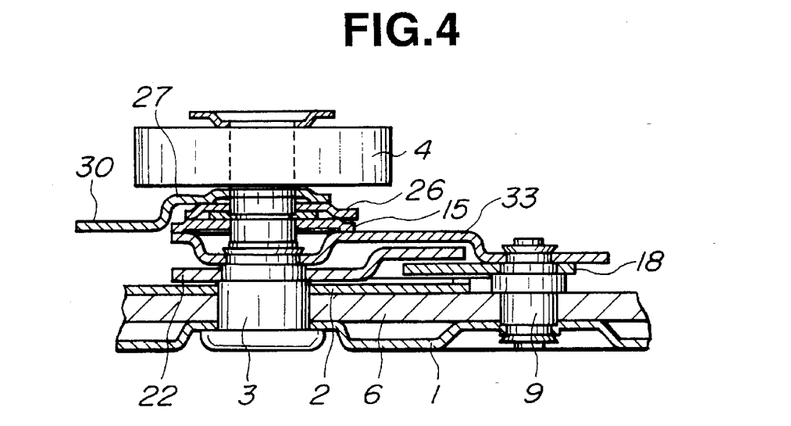
FIG. 4 is a cross-section taken along line C—C of FIG. 1.
Figure 5:
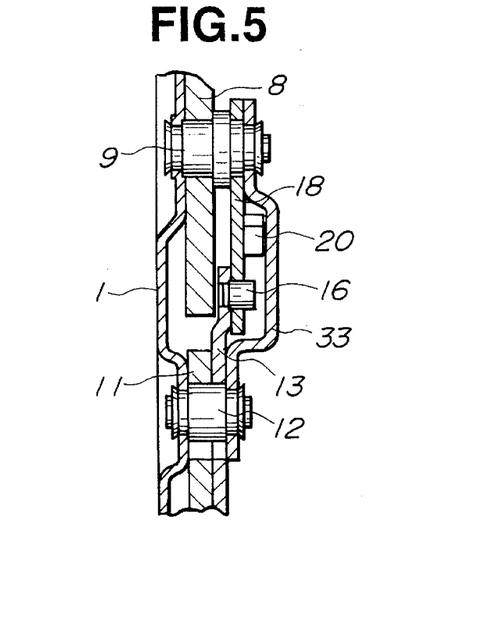
FIG. 5 is a cross-section taken along line B—B of FIG. 1.

Referring now to the drawings, particularly to FIGS. 1 and 2, the reclining device with the angular position memory according to the invention is exemplified in case of a front reclining seat of two-door type vehicle. As seen in FIGS. 1 and 2, the reclining device of the embodiment includes a base plate 1 firmly fixed to a seat cushion (not shown) or an upper moveable rail (not shown) of a seat slide used for fore-aft position adjustment. The reclining device includes a seatback side arm 2 which is firmly secured to a seat back (not shown) by way of bolts and rotatably received by a main pivot shaft 3 rotatably attached to the base plate 1. As seen in FIGS. 2 to 4, the arm 2 is pre-loaded in the forward inclination direction of the seat back by means of a spiral spring or a power spring 4. The arm 2 is integrally formed with an upper sector gear 6 having a sectoral toothed portion 5 and a sectoral non-toothed portion 6a, by means of pin connection, namely two pins 6b and a pin 6c illustrated in FIG. 2. The arm 2 is pivotally received by the main pivot shaft 3. A pivot shaft 9 is fitted to the base plate 1 to pivotably receive a lower lock plate 8 having a toothed portion 7. The toothed portion 7 of the lock plate 8 meshes with the toothed portion 5 of the upper sector gear 6 through clockwise pivotal movement (viewing FIG. 1) of the lock plate 8. As appreciated from FIG. 2, the pin 6c penetrates through two circular holes of the upper sector gear 6 and the arm 2 and engages with the semi-circular hooked end of the spiral spring 4 at the outside end thereof. That is, the outside end of the pin 6c serves as a spring hanger for the spiral spring 4. The lower lock plate 8 has a recessed cam follower section 10 engaging with a substantially rounded cam surface 11a of a boomerang-shaped cam 11 for the purpose of cam connection. The cam 11 is pivotably supported by a pivot shaft 12 attached to the base plate 1. As seen in FIG. 2, a cam lever 13 is firmly fitted onto the cam 11 for pivotal movement together therewith. As best shown in FIG. 3, a connecting rod 14 is, at one end, firmly fixed to the cam lever 13 and is, at the other end, connected through an arcuate slot 33a of a holder plate 33 to an elliptic hole 15a of a reclining-seat operating lever or reclining lever 15 by way of a push nut 15b. The operating lever 15 is pivotably received by the main pivot shaft 3. As appreciated from FIG. 2, the holder plate 33 is unrotative in relation to the base plate 1, owing to pin connection, namely the main pivot shaft 3, and the pivot shafts 9 and 12. The operating lever 15 is biased clockwise by means of a return spring 42 hanged between the right-angled portion of the holder member 33 and the right-angled portion of the operating lever 15. As best seen in FIG. 5, a relatively small pin 16 is firmly fitted to the cam lever 13 and projected from the flat side plane of the cam lever 13. The cam lever 13 is mechanically linked to a substantially tri-angle pivotal member 18 formed with an elliptic hole 17 so that the pin 16 is slidably fitted into the hole 17. The pivotal member 18 is also pivotably supported by the pivot shaft 9 which pivotably receives the upper sector gear 6. The pivotal member 18 is formed with an inverted U-shaped sliding-contact portion 20 which is right-angled on the one side of the pivotal member 18.

Pivotably supported on the main pivot shaft 3 of the base plate 1 is a sliding-contact member 22 having an essentially sectoral sliding-contact portion 21. The sliding-contact portion 21 can be brought into sliding-contact with the reversed U-shaped sliding-contact portion 20 of the pivotal member 18. The sliding-contact member 22 is formed with a right-angled tub-like projection 23 projected outside of the seat back. The sliding-contact member 22 is rotationally biased clockwise by means of a return spring 24 which is hanged between a right-angled spring-hook hanger 2a integrally formed on the arm 2 and a spring end holding hole 22a punched in the sliding-contact member 22. The right-angled projection 23 of the sliding-contact member 22 is engageable with a first stepped projection 30 of a main memory plate 27 as set forth below. The maximum clockwise movement of the sliding-contact member 22 is restricted by a right-angled stopper 25 integrally formed on the arm 2. The stopper 25 also serves as a spring hanger as set forth later.

Figure 7:
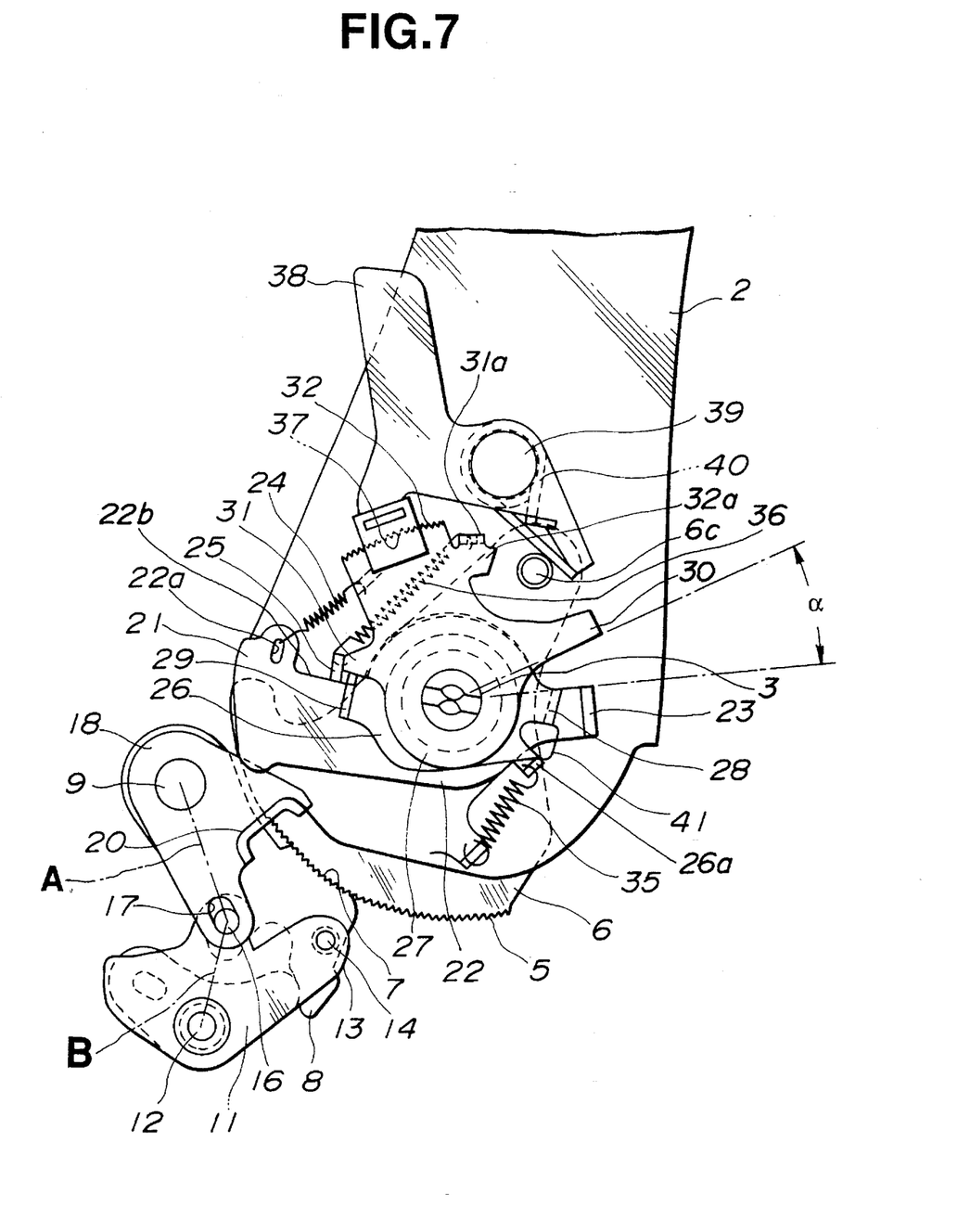
FIG. 7 is a side view illustrating an initial mechanical linked relation of the angular position memory just after completion of a series of memorizing operation of the memory, subsequently to pre-setting the seat back to a desired reclining angular position.

As seen in FIGS. 2 through 5, the angular position memory of the reclining device of the invention also includes the auxiliary memory plate 26 and the main memory plate 27, both being rotatably supported on the main pivot shaft 3 coaxially with respect to the sliding-contact member 22 in such a manner that the auxiliary memory plate 26 and the main memory plate 27 are overlapped to each other. As seen in FIG. 7, the auxiliary memory plate 26 has a pair of diametrically opposing right-angled projections 28 and 29. As shown in FIG. 2, the two projections 28 and 29 are bent to extend in opposite axial directions with respect to the center axis of the main pivot shaft 3. On the other hand, the main memory plate 27 has the first stepped projection 30 and a second flat projection 31, as shown in FIGS. 2 and 7. The first projection 30 is engageable with the right-angled projection 23 of the sliding-contact member 22, while the second projection 31 is engageable with the outside right-angled projection 29 of the auxiliary memory plate 26. As detailed later, the inside right-angled projection 28 is engageable with a stationary stopper 41 of the holder plate 33. A return spring 35 is hanged between a spring hanger hook 34 integrally formed on the holder plate 33 and a spring hook hanger 26a integrally formed on the auxiliary memory plate 26. Thus, the auxiliary memory plate 26 is pre-loaded clockwise by means of the spring 35. The maximum clockwise movement of the auxiliary memory plate 26 is restricted by abutment between the inside right-angled projection 28 and the stopper 41. As best seen in FIG. 7, a return spring 36 is hanged between the stopper 25 for the sliding-contact member 22 and a spring hook hanger 31a integrally formed on the main memory plate 27. As seen in FIGS. 2 and 7, the main memory plate 27 has a sectoral toothed portion 32 and a non-toothed projection 32a formed adjacent to the toothed portion 32. The main memory plate 27 is spring-loaded in the anti-clockwise direction by way of the spring 36. Thus, the counterclockwise movement of the main memory plate 27 is restricted by abutment between the second projection 31 and the projection 29. As appreciated from FIG. 7, the rotational angle range of the main memory plate 27 is limited by abutment between the pin 6c and the first projection 30 and by abutment between the pin 6c and the non-toothed projection 32a. In more detail, the maximum memorizable backward reclining angle is limited by abutment between the pin 6c and the projection 30, while the maximum memorizable forward reclining angle is limited by abutment between the pin 6c and the projection 32a.

As shown in FIG. 7, the angular position memory also includes a pivotable memory lever 38 employing a geared member 38a consisting of synthetic resin material. The geared member 38a has a toothed portion 37 which can be brought into meshed contact with the toothed portion 32 of the main memory plate 27. Although it is not clearly shown in the drawing, the toothed portion 37 is formed on a substantially intermediate stepped section of the geared member 38a being formed in an essentially L-shape in cross-section. The memory lever 38 is pivotally supported on a pivot shaft 39 attached to the seatback side arm 2. The pivot shaft 39 also serves as a spring guide bar for a return spring 40 having a straight armed end and a one-step bent end. The straight armed end of the spring 40 is hanged by the pin 6c, while the one-step bent end is hanged by a straight armed portion of the memory lever 38. The memory lever 38 is spring-biased in the anti-clockwise direction (viewing FIG. 7) by the bias of the spring 40. The maximum clockwise movement of the memory lever 38 is restricted by abutment between the straight armed portion of the memory lever 38 and the pin 6c. With the previously-noted arrangement, the reclining device with the memory operates as follows.

When the vehicle occupant seated on the front seat wants to shift from the current angular position of the reclining seatback to a new angular position, the reclining-seat operating lever 15 is first pulled upwards. In FIG. 1, a new operating lever position resulting from this pulling motion is illustrated by the two-dotted line of FIG. 1. In this case, the operating lever 15 is rotated in the clockwise direction about the main pivot shaft 3. The clockwise movement of the operating lever 15 is transmitted through the connecting rod 14 to the cam lever 13, with the result that the cam lever 13 is rotated in the anti-clockwise direction about the pivot shaft 12. The cam 11 fitted to the cam lever is also rotated counterclockwise about the pivot shaft 12. Thus, the cam surface 11a of the cam 11 is shifted into the recessed cam follower section 10 of the lower lock plate 8, with the result that the lower lock plate 8 slightly rotates in the clockwise direction about the pivot shaft 9. Accordingly, the meshed contact relation between the two toothed portions 5 and 7 is shifted from an engaging state shown in FIG. 6A to a disengaging state shown in FIG. 6B. In this manner, since the sector gear 6 becomes out of meshed contact with the lock plate 8, i.e., the locked state of the seatback side arm 2 is released, the seat back rotates in the forward inclination direction about the pivot shaft 3. Thereafter, the seat back is pushed backwards by the back of the seated passenger on the cushion of the front seat for the purpose of a desired angular inclination adjustment. In accordance with the desired angular inclination adjustment of the seat back, the arm 2 also shifts to a particular angular position. When the desired angular inclination is reached, the operating lever 15 is released, thereby causing the recovery of the lever 15 toward the spring-set position. Thus, the cam surface 11a of the cam 11 moves out of the recessed cam follower section 10. Through the cam transmission, the lower lock plate 8 is rotated anti-clockwise, with the result that the toothed portion 7 of the lock plate 8 is brought into meshed contact with the toothed portion 5 of the upper sector gear 6. That is, based on releasing operation of the lever 15, the meshed contact relation between the sector gear 6 and the lock plate 8 is changed again from the disengaging state of FIG. 6B to the engaging state of FIG. 6A. As set forth above, the angular inclination position of the seat back can be adjusted to a desired angular position.

Subsequently to the above, the following angular position memory operation must be executed in order to memorize the previously-noted adjusted angular inclination position of the seat back.

First of all, the memory lever 38 is rotated clockwise against the spring bias of the spring 40 so as to disengage the toothed portion 37 attached onto the memory lever 38 from the toothed portion 32 of the main memory plate 27. As a result, the three members constructing the memory, namely the main memory plate 27, the auxiliary memory plate 26, and the sliding-contact member 22 cooperate with each other, so as to mechanically memorize the adjusted angular inclination position of the seatback side arm 2. To achieve the mechanical memorizing operation, the above-mentioned three members rotationally shift to the respective angular positions, as even as the memory lever 38 is pulled and shifted from a locked position wherein the toothed portion 37 is in meshed contact with the toothed portion 32 to an unlocked position wherein the toothed portion 37 is out of meshed contact with the toothed portion 32. Since the main memory plate 27 is pre-loaded counterclockwise by way of the spring 36, the main memory plate 27 rotates until its second projection 31 abuts the outside right-angled projection 29 of the auxiliary memory plate 26. Since the auxiliary memory plate 26 is pre-loaded by the bias of the spring 35 and the spring load of the spring 35 is designed to be greater than that of the spring 36, the auxiliary memory plate 26 rotates clockwise until its inside right-angled projection 28 abuts the stationary stopper 41 of the holder plate 33 fixed on the base plate 1. On the other hand, since the sliding-contact member 22 is pre-loaded by the spring-bias of the spring 24, the clockwise rotational movement of the sliding-contact member 22 is stopped by abutment with the stopper 25. Under these conditions, when the memory lever 38 is released and returned in the locked position, the mechanical memorizing operation of the memory is completed by engagement of the meshing pair, namely the toothed portions 37 and 32. In this manner, the desired angular inclination position can be mechanically memorized through the previously-noted angular displacements of the three members as shown in FIG. 7.

Figure 8:
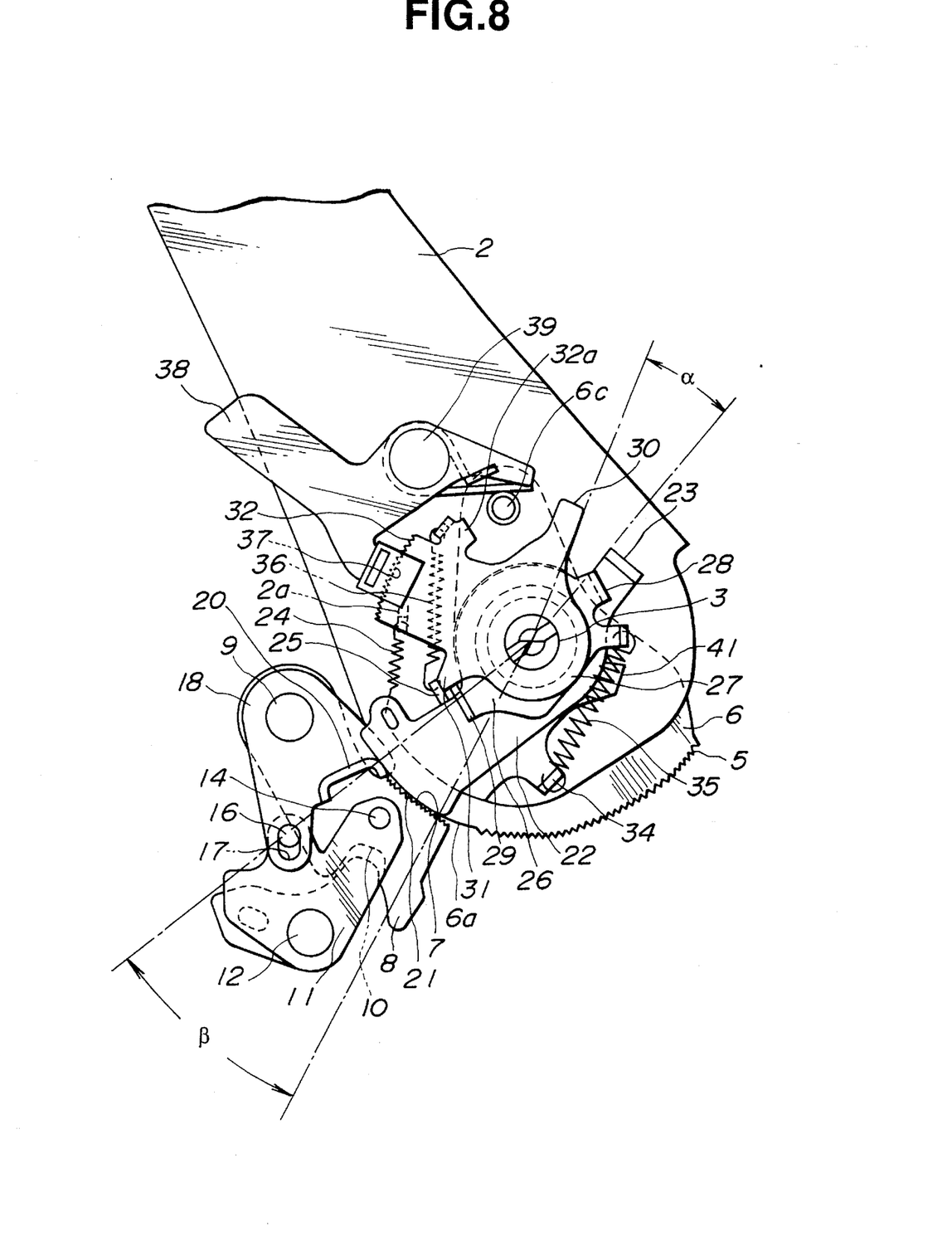
FIG. 8 is a side view illustrating a mechanical linked relation of the memory at the most forward inclination position of the seat back.

Under such a condition that the desired angular inclination position of the seat back has been memorized, when it is necessary to incline the seat back forwards in case that the passenger seated on the rear seat gets out of the car or the passenger gets in the rear seat of the car, the toothed portion 5 of the upper sector gear 6 must be disengaged from the toothed portion 7 of the lower lock plate 8. Therefor, the reclining-seat operating lever 15 is pulled upwards. Thus, the seat back, i.e., the arm 2 rotates from the preset angular inclination position illustrated in FIG. 7 to the maximum forward angular inclination position illustrated in FIG. 8. In a conventional manner, the maximum forward angular inclination position of the arm 2 is restricted by a stopper (not shown) engageable with the arm at this position. As seen in FIG. 8, according to the forward rotational movement of the seat back and the arm 2, the main memory plate 27 being in meshed engagement with the memory lever 38 and the sliding-contact member 22 abutting the stopper 25 attached to the arm 2 also rotate anti-clockwise with the same forward angular displacement as the arm 2. Additionally, the main memory plate 27 rotates anti-clockwise together with the auxiliary memory plate 26 through abutment between the two projections 31 and 29.

On the other hand, the pivotal member 18, which engages with the cam lever 13 through loose fit between the pin 16 and the elliptic hole 17, tends to slightly rotate clockwise owing to the anti-clockwise movement of the cam lever 13, based on the clockwise movement of the operating lever 15. The clockwise rotation of the pivotal member 18 is negligible. As appreciated from FIG. 8, the sliding-contact portion 21 of the sliding-contact member 22 is brought into sliding-contact with the inverted-U-shaped sliding-contact portion 20 of the pivotal member 18, owing to the anti-clockwise rotational movement of the sliding-contact member 22. Owing to the sliding-contact between the sliding-contact portions 20 and 21, the pivotal member 18 is forced to rotate clockwise. The clockwise rotational movement of the pivotal member 18 causes the cam lever 13 to rotate counterclockwise. As a result, the cam surface 11a of the cam 11 moves into the recessed cam follower section 10 of the lock plate 8 and thus the lock plate rotates clockwise so that the toothed portion 7 of the lock plate 8 is moved apart from the non-toothed portion 6a of the upper sector gear 6. Accordingly, the previously-noted sliding-contact prevents the toothed portion 7 of the lock plate 8 from coming into contact with the non-toothed portion 6a of the sector gear 6.

Figure 9:
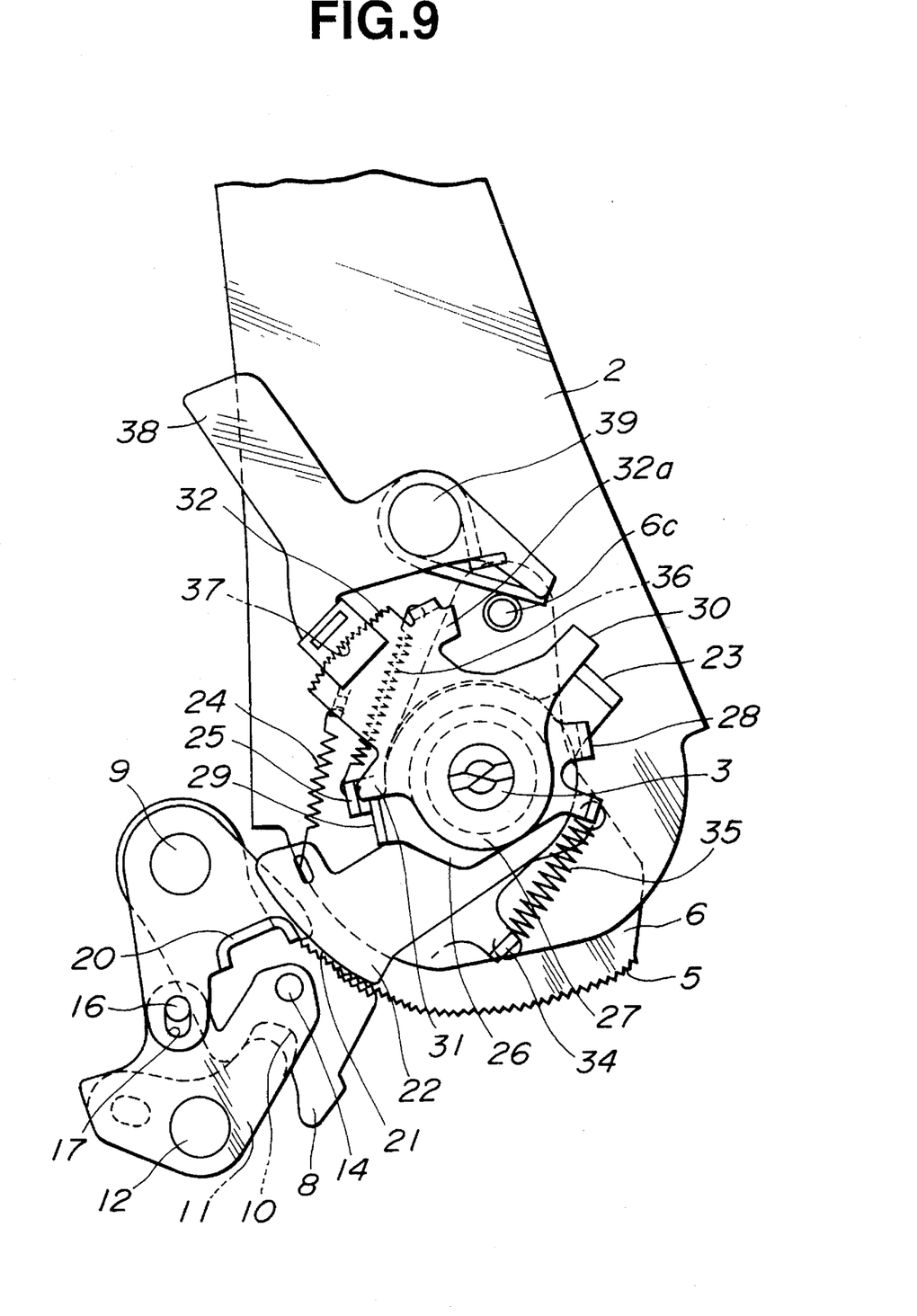
FIG. 9 is a side view illustrating a mechanical linked relation of the memory in a transient state from the forward inclination position to the backward inclination position.
Figure 10:
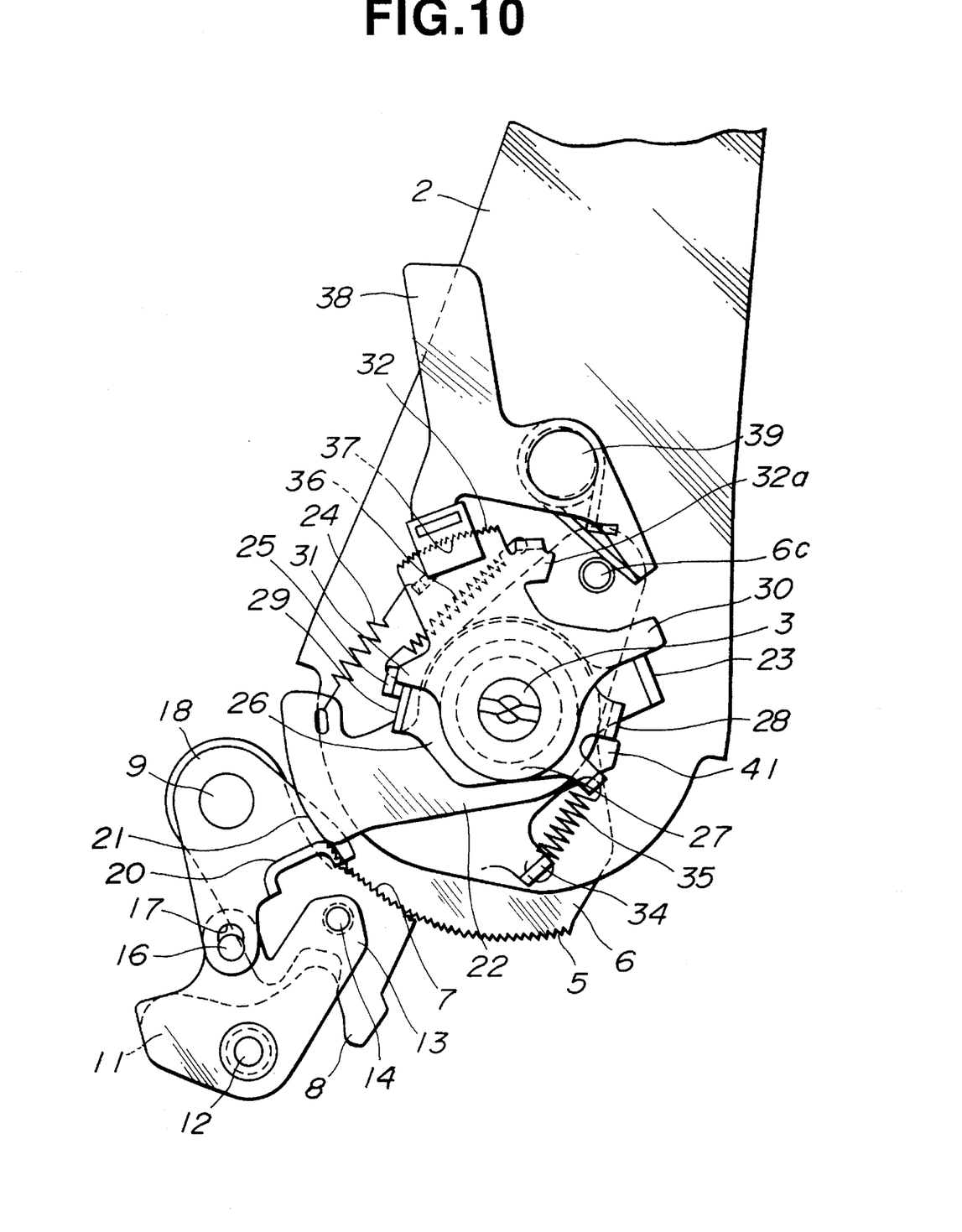
FIG. 10 is a side view illustrating a mechanical linked relation of the memory just before recovering the seat-back to the preset initial reclining angular position.

In the event that the seat back is returned to the preset angular inclination position after the vehicle occupant has been seated on the rear seat, the seat back, i.e., the arm 2 is rotated clockwise from the maximum angular inclination position shown in FIG. 8 via a transient angular inclination position shown in FIG. 9 finally to a seat-back locked position shown in FIG. 10. As appreciated from FIGS. 8 and 9, at the beginning of the recovery motion of the seat back to the preset position, the main memory plate 27 rotates clockwise at the same backward angular displacement as the arm 2 since the main memory plate 27 remains meshed with the memory lever 38. Simultaneously, the auxiliary memory plate 26 rotates clockwise together with the main memory plate 27 while the two projections 29 and 31 abut each other. On the other hand, the sliding-contact member 22 is not rotated, since the two sliding-contact portions 20 and 21 remain engaged with each other. In this manner, the first projection 30 of the main memory plate 27 approaches to the right-angled tub-like projection 23 of the sliding-contact member 22. Immediately when the projection 30 comes into contact with the projection 23 as shown in FIG. 9, the sliding-contact member 22 is forced to rotate clockwise against a frictional force between the sliding-contact portions 20 and 21, according to a further clockwise rotational movement of the main memory plate 27.

Returning to FIGS. 7 and 8, the angle $\alpha$ between the two projections 30 and 23 is univocally determined depending on the angular inclination position of the seat back, i.e., the arm 2. In FIG. 8, the angle $\beta$ with respect to the pivot shaft 3 designates the angle range of the sliding-contact portion 21 of the member 22 which has already passed through the sliding-contact portion 20 according to the forward inclining motion of the seat back. As appreciated from FIG. 7, after completion of the desired angular position memorized operation, the auxiliary memory plate 26 is necessarily positioned at a spring-set angular position by abutment between the stationary stopper 41 and the projection 28, and in addition the main memory plate 27 is positioned at an initial position by abutment between the two projections 31 and 29. On the other hand, a phase angle of the sliding-contact member 22 relative to the two plates 26 and 27 is changed depending on the angular inclination of the seat back, because a substantially radially extending abutment portion 22b of the sliding-contact member 22 is biased to abut the stopper 25 fixed onto the arm 2 by the spring 2, and thus the stopper 25 of the arm 2 rotates along with the sliding-contact member 22 with the same angular displacement as the arm 2 during fore-aft angular inclination adjustment of the seat back. Therefore, the angle $\alpha$ can be univocally determined depending on the preset angular inclination position of the seat back.

Referring to FIGS. 9 and 10, when the sliding-contact member 22 is forced to rotate clockwise owing to the further clockwise rotation of the main memory plate 27 after the projection 30 of the main memory plate 27 is brought into contact with the projection 23 of the sliding-contact member 22, the state of the member 22 shifts from the sliding-contact state shown in FIG. 9 toward the end of the sliding-contact state shown in FIG. 10. In other words, as appreciated from FIG. 8, when the main memory plate 27 rotates by the sum of the two angles $\alpha$ and $\beta$, the sliding-contact portion 21 of the sliding-contact member 22 is put out of sliding-contact with the sliding-contact portion 20 of the pivotal member 18. FIG. 10 shows a moment when the sliding-contact portion 21 starts to disengage from the sliding-contact portion 20. When the sliding-contact portion 21 disengages from the sliding-contact portion 20, the toothed portion 7 is brought into meshed contact with the toothed portion 5 of the sector gear 6 to lock the seat back. The sliding-contact surface of the sliding-contact portion 21 is dimensioned, so that the sliding-contact portion 21 of the member 22 is disengaged from the sliding-contact portion 20 of the member 18 at the moment when the seat back, i.e., the arm 2 reaches the memorized angular inclination position wherein the projection 28 of the auxiliary memory plate 26 starts to abut the stopper 41. Thus, the angular inclination position of the seatback side arm 2 illustrated in FIG. 10 is equivalent to the memorized angular inclination position of FIG. 7. As set forth above, since the seat back can be mechanically self-adjusted in the memorized angular inclination position by virtue of the memory, it is unnecessary to reset the angular inclination position of the seat back to an initial position each time getting in and out of a car.

Figure 6A:
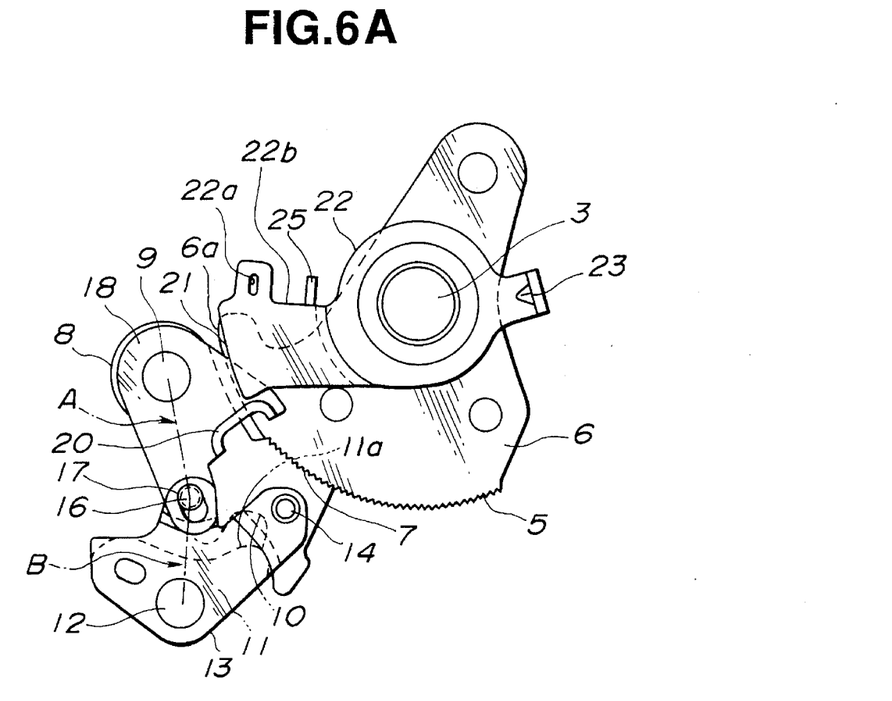
FIGS. 6A and 6B are explanatory views illustrating the meshing relation between an upper sector gear and a lower lock plate during reclining angle adjustment.
Figure 6B:
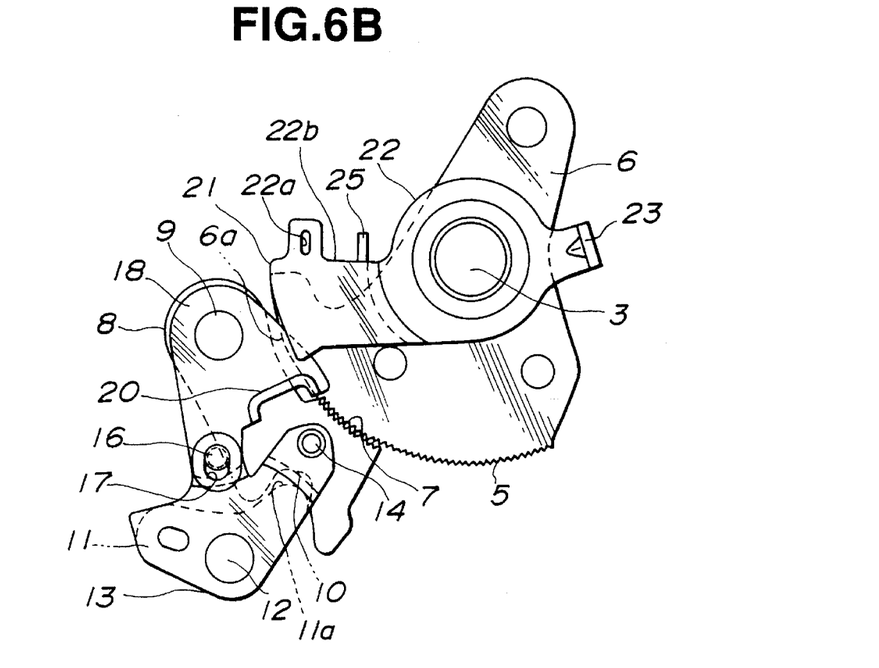

As will be appreciated from the above, once a desired angular inclination position of the seat back is preset by means of the memory, the sliding-contact member 22 is brought into sliding-contact with the pivotal member 18 through the two sliding-contact portions 20 and 21, in accordance with the forward inclining motion of the arm 2. The contact between the two sliding-contact portions 20 and 21 prevents meshed contact between the toothed portion 5 of the upper sector gear 6 and the toothed portion 7 of the lower lock plate 8 and prevents sliding-contact between the non-toothed portion 6a of the sector gear 6 and the toothed portion 7 of the lock plate 8 during the forward inclining motion, and whereby tooth wear is avoided. In the former half of backward inclining motion of the arm 2 for the recovery to the memorized angular inclination position, as illustrated in FIGS. 8 to 9, the engagement between the pivotal member 18 and the sliding-contact member 22 prevents meshed contact between the toothed portions 5 and 7 and prevents contact between the non-toothed portion 6a and the toothed portion 7, since the sliding-contact portion 21 of the sliding-contact member 22 still remains engaged with the sliding-contact portion 20 of the pivotal member 18 by means of frictional force created between the two contact portions 20 and 21. In the latter half of backward inclining motion of the arm 2, as illustrated in FIGS. 9 to 10, the pivotal member 18 is finally disengaged from the sliding-contact member 22 at the end of backward inclining motion of the arm 2, as shown in FIG. 10, since the sliding-contact member 22 is rotated by a further clockwise rotation of the main memory plate 27 in a direction wherein the sliding-contact portion 21 gradually moves away from the sliding-contact portion 20. Each time the toothed portion 5 becomes meshed with the toothed portion 7 in synchronization with the moment of disengagement of the sliding-contact member 22 from the pivotal member 18, the preset or memorized angular inclination position (reclining angle) of the arm 2 can be recovered, since the sliding-contact surface of the sliding-contact portion 21 of the member 22 is dimensioned so that the sliding-contact portion 21 is disengaged from the sliding-contact portion 20 at the moment when the arm 2 reaches the memorized angular inclination position. As previously noted, the sliding-contact between the portions 20 and 21 creates a frictional force. As is generally known, the frictional force at the sliding-contact point or the sliding-contact line between the sliding-contact portions 20 and 21 is substantially proportional to the magnitude of normal force acting at the contact point or line. The greater the normal force becomes, the greater the frictional force becomes. The magnitude of the normal force is dependent on a lever ratio of the distance A between the pin 16 and the pivot shaft 9 to the distance B between the pin 16 and the pivot shaft 12 as seen in FIG. 6A, as well as the bias of the return spring 42 acting on the reclining-seat operating lever 15 mechanically linked through the cam lever 13 to the pivotal member 18. Thus, the above-mentioned frictional force can be properly adjusted by varying the lever ratio A/B. For instance, when the lever ratio A/B becomes smaller, the magnitude of the frictional force also becomes smaller in proportion to a decrease in the normal force. Actually, the lever ratio A/B and the bias of the return spring 42 are both determined in consideration of at least the bias of the return spring 24 acting on the sliding-contact member 22. That is, the lever ratio A/B is designed so that the frictional force created by the contact between the two portions 20 and 21 is set to become such a minimum possible value that the sliding-contact portion 21 of the sliding-contact member 22 remains engaged with the sliding-contact portion 20 of the pivotal member 18 against the bias of the spring 24. As set forth above, since the magnitude of frictional force owing to the contact between the two members 22 and 18 can be suitably set to a minimum possible value, on the reclining seats with an angular inclination position memory, the backward inclining effort of the passenger can be reduced during backward inclining operation of the seat back.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A reclining device with an angular inclination position memory mechanism comprising:

an arm fixed to a seat back for co-rotation therewith;

a base plate fixed to a seat cushion;

a pair of memory plates pivotally mounted on said arm by a first pivot shaft and cooperative to each other for mechanically memorizing an angular inclination position of said arm by engaging a first memory plate of said memory plates with said arm and by engaging a second memory plate of said memory plates with said base plate;

a spring-loaded sliding-contact member pivotally supported on said arm by said first pivot shaft and being engaged with said first memory plate during a backward inclining motion of said arm and enraged with a stopper fixed to said arm during a forward inclining motion of said arm, said sliding-contact member being pre-loaded toward said stopper;

a sector gear fixed to said arm and having a non-toothed portion and a first toothed portion;

a lock plate pivotally supported on said base plate by a second pivot shaft and having a second toothed portion which is meshable with said first toothed portion of said sector gear for preventing rotation of said arm;

a cam lever pivotally supported on said base plate by a third pivot shaft and mechanically linked to said lock plate through cam contact and to a reclining lever, said reclining lever being permanently biased by a return spring toward its spring-set position; and means for avoiding contact between said second toothed portion of said lock plate and said first toothed portion of said sector gear and between said second toothed portion and said non-toothed portion of said sector gear during rotation of said arm, said means for avoiding contact, including a pivotal member pivotally supported on said base plate by said second pivot shaft and mechanically linked to said cam lever for avoiding contact between said first and second toothed portions and between said second toothed portion and said non-toothed portion through sliding-contact between said pivotal member and said sliding-contact member when a predetermined angular inclination position of said arm has been reached through the forward inclining motion of said arm and for establishing meshed engagement between said first and second toothed portions by releasing said sliding-contact when a memorized angular inclination position of said arm has been reached through the backward inclining motion of said arm.

2. The reclining device as set forth in claim 1, wherein said means for avoiding contact further includes means for regulating a frictional force created by sliding-contact at said pivotal member so that said frictional force is set at a minimum possible value necessary to retain said sliding-contact member in engagement with said pivotal member against a pre-load biasing of said sliding contact member toward said stopper, said means for regulating said frictional force including a pin attached to said cam lever and an elliptic hole formed in said pivotal member so that said cam lever and said pivotal member are linked to each other by said pin slidably fitted into said elliptic hole.

3. The reclining device as set forth in claim 2, wherein a lever ratio of a distance between said second pivot shaft and said pin to a distance between said third pivot shaft and said pin is designed so that said frictional force created at a sliding-contact surface between said pivotal member and said sliding-contact member by a bias of said return spring acting on said reclining lever is set at said minimum possible value.

* * * * *